Feb. 12, 1963 R. E. LOUDON ET AL 3,077,590

READ-OUT AND CODE TRANSLATING SYSTEM

Filed Dec. 17, 1958 5 Sheets-Sheet 1

READ-OUT AND CODE TRANSLATING SYSTEM

READ-OUT AND CODE TRANSLATING SYSTEM

Filed Dec. 17, 1958

5 Sheets-Sheet 4

United States Patent Office 3,077,590
Patented Feb. 12, 1963

3,077,590

READ-OUT AND CODE TRANSLATING SYSTEM

Robert E. Loudon, Los Angeles, Kenneth F. Oldenburg, Monterey Park, William R. Beall, Glendale, Chris A. Christoff, San Gabriel, and James M. Payton, Jr., Rosemead, Calif., assignors to Clary Corporation, San Gabriel, Calif., a corporation of California Filed Dec. 17, 1958, Ser. No. 781,153
9 Claims. (Cl. 340—347)

This invention relates to read-out systems for electronic data handling equipment and the like and has particular reference to read-out systems capable of translating information registered in a combinational unit code into a single unit code.

In the copending application of Robert E. Loudon, Serial No. 692,881, filed October 28, 1957, a simple and effective read-out system is disclosed and claimed for concurrently reading out and translating a combinational unit code into a single unit code. This system employs a matrix of contacts formed into patterns which are arranged in accordance with a particular combinational code being used. A scanning device successively scans the different patterns of contacts and electrically compares such patterns with the coded information being read out.

Although the above system works satisfactorily in connection with a type of registering or recording device, such as is disclosed in said application, wherein the registering device may be actuated or arrested at anytime during the cycle and is thereafter held in such condition throughout the remainder of the cycle, certain difficulties arise when the system is applied to a recording device in which the recording is only momentarily effected at any of different timed intervals during a cycle. This is due to the fact that in many combinational unit codes a unit representing one single numeral digit or character may be combined with one or more other units to represent a second single digit or character. Thus, as the scanning device successively scans the various patterns of contacts during a cycle, it may successively effect two or more registrations or recordings, all but one of which would be unwanted.

It, therefore, becomes a principal object of the present invention to overcome the above noted defects.

Another object is to provide a read-out system for translating any type of combination unit code into a single unit code.

Another object is to provide a read-out system for concurrently translating and reading out information from an electronic data handling apparatus having any type of combinational unit coded output.

Another object is to provide a read-out system for translating any type of combinational unit code into a single unit code in which no time delay is necessary for effecting such translation.

Another object is to provide a relatively simple and inexpensive read-out system capable of translating any type of combinational unit code into a single unit code.

The manner in which the above and other objects of the invention are accomplished will be readily understood on reference to the following specification when read in conjunction with the accompanying drawings, wherein.

Figure 1:
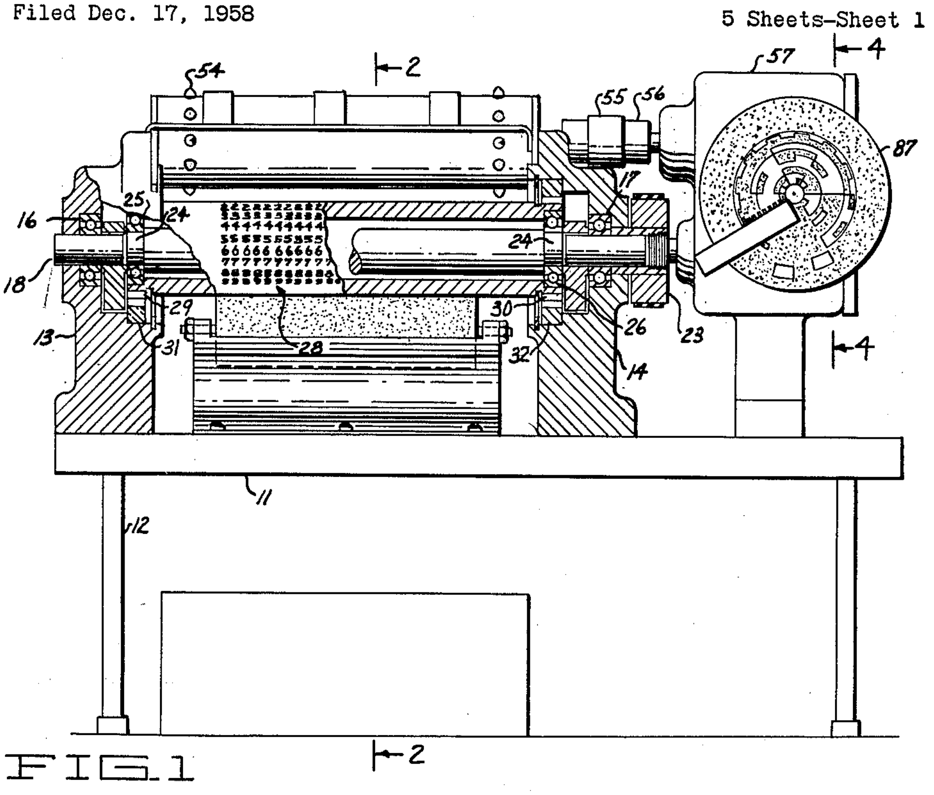
FIG. 1 is a front view, partly in section, of a printer to which the present invention is applied.
Figure 2:
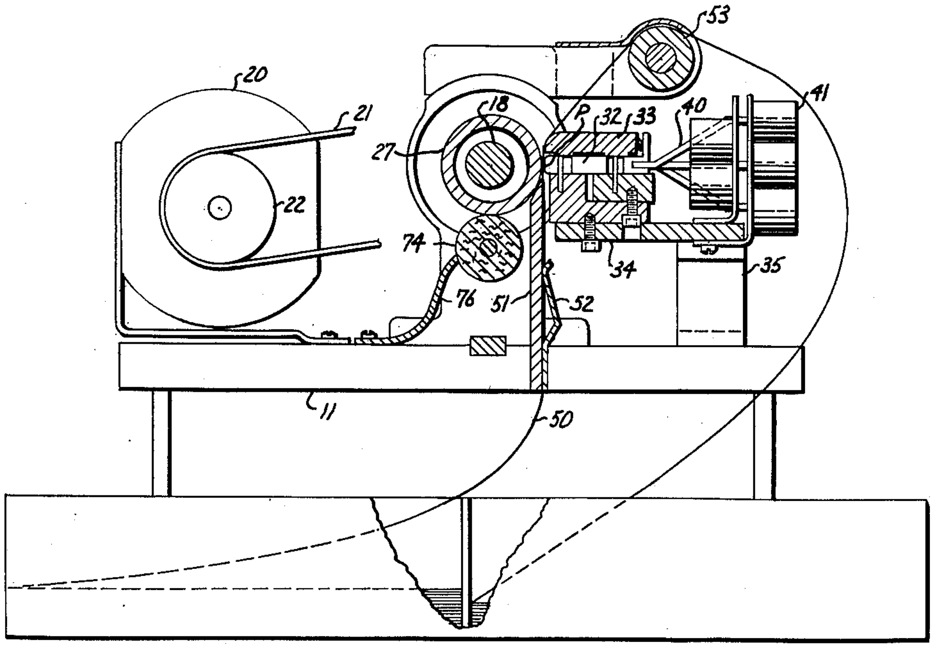
FIG. 2 is a sectional side view taken substantially along the line 2—2 of FIG. 1.
Figure 3:
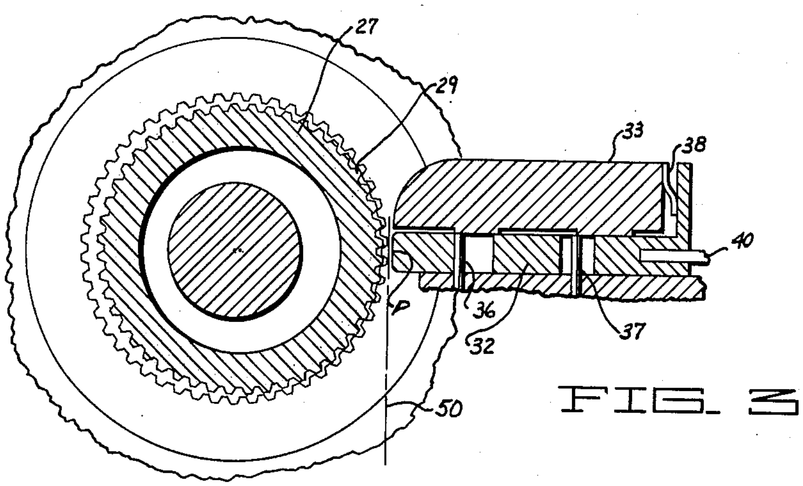
FIG. 3 is an enlarged section view through the printing drum and platen unit.

Describing first the printing mechanism shown in FIGS. 1 through 6, such mechanism is basically similar to that disclosed in detail and claimed in the copending application of Witt and Christoff, Serial No. 770,719, filed on October 30, 1958 and since matured into Patent No. 2,915,968, issued on December 8, 1959. Reference may be had to said application for details not specifically disclosed herein. However, it should be understood that the invention is not limited to the particular type of printer disclosed, but may be applied to other types of printers which require for proper operation the timed functioning of one or more printer elements.

Referring to the drawings, the printer comprises a base 11 supported by legs 12. A pair of bearing brackets 13 and 14 supported by the base, house ball bearings 16 and 17, respectively. The latter rotatably support end sections of a drive shaft 18 which is rotated by a motor 20. A belt 21 is wrapped around a pulley 22 fixed on the motor shaft and a second pulley 23 fixed to the shaft 18.

Eccentric portions 24 formed on the shaft 18 support the inner races of ball bearings 25 and 26 whose outer races support a printing drum 27. The drum is hollow and surrounds shaft 18 without touching the same. The drum has a plurality of adjacent circumferentially extending rows of numerical type characters 28 spaced therearound.

External gears 29 and 30 (see also FIGS. 3 and 5) are formed on the opposite ends of the drum 27 concentrically thereof and these mesh with internal gears 31 and 32 secured in the brackets 13 and 14, respectively. The latter gears are arranged concentric with the shaft 18.

The numeral type characters 28 are divided into two identical sets ranging in value from "0" to "9" with two blank spaces (not shown) between each set, thereby resulting in twenty-four spaces around the drum. Now, each of the external gears 29 and 30 is formed with forty-eight teeth which mesh with fifty teeth formed in the mating internal gears 31 and 32. Accordingly, upon each complete rotation of the shaft 18 and consequent orbital movement of the drum 27 about the center of the shaft, the drum will creep 1/24 of a complete rotation or from one character position to the next relative to a printing point P established by individual printing platens 32.

The various platens are arranged in side-by-side relation and each is aligned with a respective one of the rows of type characters 28. The platens are slideably mounted in a guide slot formed in a block 33 extending along the length of the drum 27 and suitably attached to a table 34 supported from the base 11 by brackets 35. Pins 36 and 37 mounted in the block 33 extend into guide slots formed in the platens 32 to both laterally guide the same and limit their length-wise movement. Leaf springs 38 are suitably attached to the rear of the block 33 to normally individually hold the platens in their rearward illustrated non-printing positions.

The various platens 32 are connected through stiff rods 40 to the armatures (not shown) of print selecting solenoids 41. A paper 50 to be printed is guided upwardly between a wall 51 and spring fingers 52, past the platens 32 and over the forward surface of the block 33, onto a feed sprocket 53.

The sprocket 53, having sprocket pins 54 thereon engageable in mating perforations in the paper 50, is intermittently rotated whereby to advance the paper from one printing line to the next. For this purpose, the sprocket is connected through a coupling 55 to a shaft 56 rotatably mounted in a bearing formed in a transmission unit housing 57. The shaft is attached to a ratchet wheel partly shown at 58 (FIG. 4) engageable by a pawl 60 pivoted at 61 to a bail 62 freely mounted on the shaft 56. A tension spring 63 attached to a tail formed on a pawl 60 normally holds the latter in engagement with the ratchet wheel 58. A roller 64 (see also FIG. 6) on the bail 62 is engageable by a cam 65 suitably fastened on a shaft 66, the latter being rotatably mounted in bearings formed in the walls of the transmission unit 57. The shaft 66 is driven by the aforementioned shaft 18 through a worm and worm gear pair 68.

Normally, the bail 62 is held out of cooperative relation with the cam 65 by a latch 70 fulcrummed at 71 and urged into latching engagement with the bail 62 by a tension spring 72. A solenoid 73 is attached to a wall of the housing 57 and has its armature connected to the latch 70 so that upon energization of the solenoid, the latch will be released, permitting the bail 62 and its roller 64 to cooperate with the cam 65, whereby to oscillate the pawl 60 and thus incrementally advance the paper feed sprocket 53 and the paper 50.

An ink impregnated roller 74 of felt or other porous material is rotatably supported in contact with the printing drum 27 by a spring bracket 76 whereby to transfer a film of ink onto the surface of the various type characters.

The operation of the printer will now be described. It will be noted on reference to FIGS. 3 and 5 that the various type characters are each substantially aligned with the pitch diameter of the teeth of the external gears 29 and 30. Accordingly, as the type drum moves in an orbit about the center of the internal gears 31 and 32, a part of each type character will describe a hypocycloidal curve as indicated at 177. It will be seen that as the type character reaches the apex of its outward travel, it will be moving substantially radially outward. If at this time a platen 32 is positioned inwardly toward the drum 27 by an associated solenoid 41, a printing contact will occur to transfer an impression of the selected type character against the paper 50.

Figure 7:
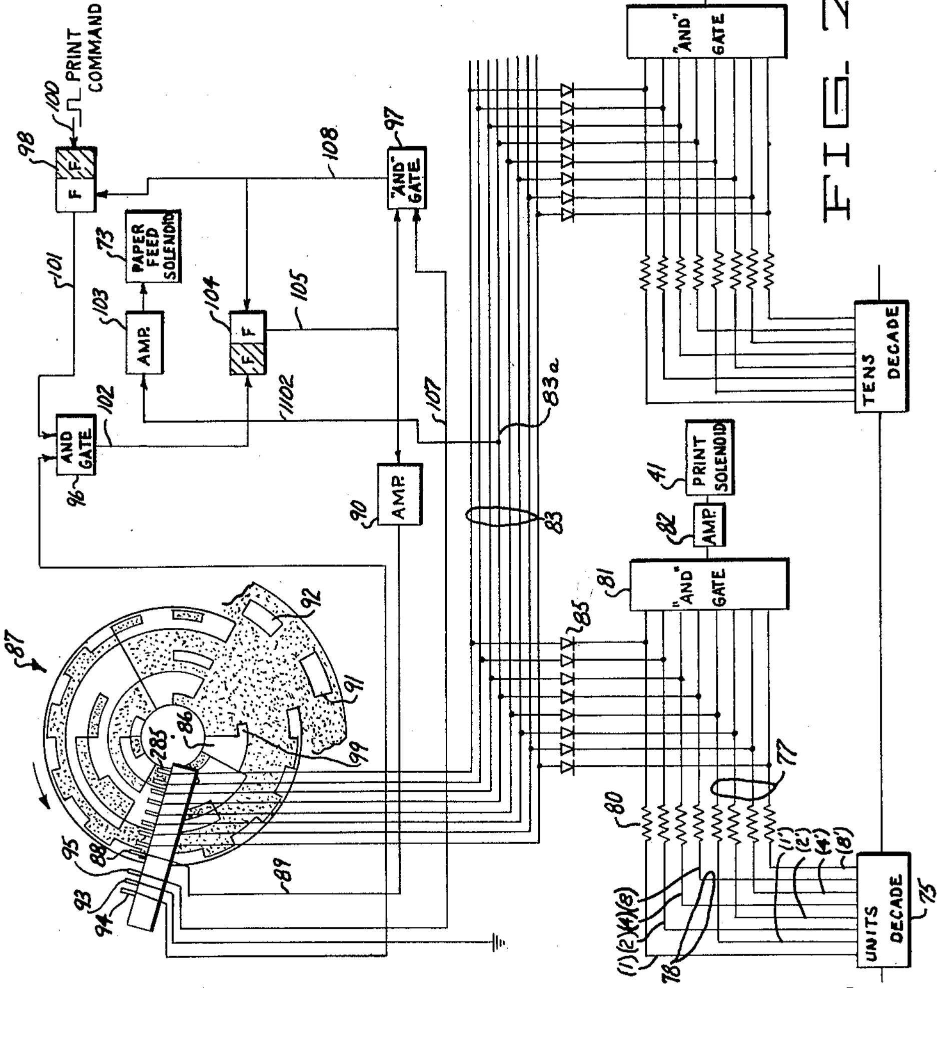
FIG. 7 is a general schematic view of a control circuit embodying a preferred form of the present invention for controlling operation of the printer.

According to the present invention, means are provided for selecting and timing the positioning of the various type platens 32 so as to selectively print amounts registered on an electronic counter register generally indicated at 75 (FIG. 7). The latter is of a type effective to register a combinational unit code and in this disclosure is intended to represent the binary coded decimal type in which the register includes a plurality of decades, i.e. a units decade 75*a*, a tens decade 75*b* and so on. Each decade comprises four stages representing the weighted values "1," "2," "4" and "8."

In most such counting registers one point in each counter stage is rendered high in potential to represent a binary "1" and another point is rendered low in potential whereas when the stage represents a binary "0" the first point is rendered low and the second is rendered high.

An example of such counting register circuit may be found in the patent to Schwend, No. 2,767,907, wherein four bistable stages 25, 26, 27 and 28 are interconnected to operate as a counter register. When a stage represents a binary "0," the right-hand anode 44 is low in potential and the left-hand anode 45 is high. On the other hand, when the stage represents a binary "1," the right hand anode is raised to a relatively high potential and the potential of the left-hand anode is lowered.

For convenience in understanding the present disclosure, each decade of the counter 75 may be considered as having four "true" outputs 78 which, when presenting a relatively high potential, represent the decimal values "1," "2," "4" and "8." Such outputs, for example, could be considered as being connected to the left-hand anodes, i.e. 45, of said patent. Four "false" outputs 77 are also provided which, when at high potential, represent the respective values "1′," "2′," "4′" and "8′." Such outputs could be considered as being connected to the right-hand anodes, i.e. 44, of said patent.

Thus, for example, the decimal value "3" would be represented when lines (1), (2), (4′), (8′) are high in potential, the lines 1′, 2′, 4 and 8 are low in potential.

The various "true" lines 78 and "false" lines 77 are connected through resistors 80 to respective inputs of a normally closed multiple input "and" gate 81. The output of the "and" gate is connected through an amplifier 82 to the respective print solenoid 41 (see also FIG. 2).

The different lines 77 and 78 are also connected to respectively valued lines 83 through diodes 85. Such lines 83 are connected in common to similar inputs of other "and" gates, like gate 81, located in the different denominational orders of the apparatus.

The lines 83 are also connected to stationary brushes 285 located in wiping contact with respective concentric rows of contacts 86 carried by a disc 87 of insulating material (FIGS. 1 and 4) fastened to the shaft 66 of the printer. It will therefore be seen that different combinations of contacts 86 wipe across their respective brushes in time with passage of the different type characters past a printing station.

All of the contacts 86 are electrically connected together and to an outer broken conductor ring 289. The latter is arranged in wiping engagement with a stationary brush 88 which is connected by line 89 to an amplifier 90.

Also located on the disc 87, but insulated from each other and from the remaining contacts, are a start contact 91 and a stop contact 92. The start contact is adapted to wipe across stationary brushes 93 and 94 while stop contact 92 is adapted to wipe across brushes 93 and 95. The center brush 93 which is common to both contacts 91 and 92 is connected to ground whereas the brush 94 is connected to one input of an "and" gate 96. The brush 95 is connected to one input of a second "and" gate 97.

A second input of the "and" gate 96 is connected to a normally low side of a flip-flop circuit 98.

Normally, no potential is applied to the brush 88 and therefore the disc 87 revolves idly along with the printer drum 27. However, upon application of a print command pulse to an input line 100 for the flip-flop 98, the condition of the latter is reversed, rendering its left-hand side high and thereby applying a high potential along line 101 to the second input of the "and" gate 96. Accordingly, when the start contact 91 passes under the brushes 93 and 94, ground potential is applied through the start contact and brush 94 to the first input of the gate 96. The gate is now opened momentarily, causing a control pulse to be applied along line 102 to a second flip-flop circuit 104, causing it to reverse its normal condition wherein its left-hand side is high to a condition wherein its right-hand side becomes high, thus applying a high potential over line 105, through the amplifier 90 and to the brush 88. Such rise in potential is also applied to the upper input of the "and" gate 97.

Accordingly, since a relatively high potential is applied to the brush 88, the circuitry will now be actuated to successively apply such potential through different contacts or contact sections 86 to different combinations of the lines 83 depending upon the configuration of the contacts on the disc 87. The contact sections 86 are so arranged and located relative to the printing drum 27 that the combination of contacts passing under the brushes 285 at any one time represent both the combinational code and its complement for the particular type characters approaching the printing station at that time.

When the combination of high potentials on the lines 83 complement the combination of high potentials on the lines 77—78 in any denominational order, the respective "and" gate is opened to apply current to the respective print solenoid, i.e. 41, to advance the associated print platen so that the selected digit may be printed.

Figure 4:
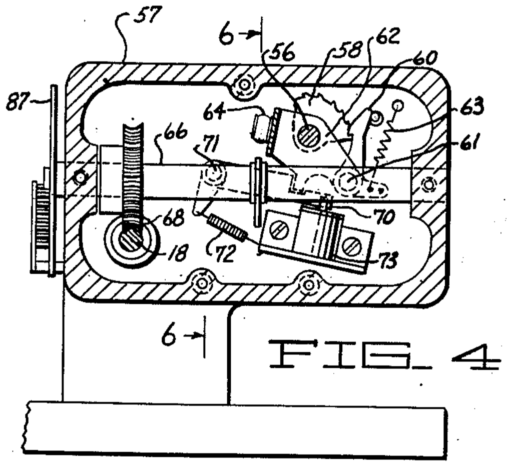
FIG. 4 is a transverse sectional view through the paper feed transmission unit and is taken substantially along the line 4—4 of FIG. 1.
Figure 5:
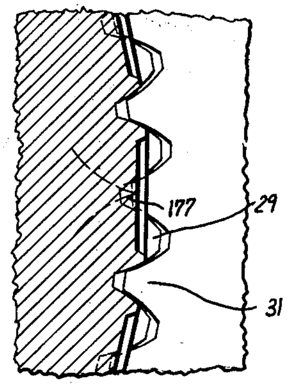
FIG. 5 is an enlarged fragmentary sectional view illustrating the relationship between the internal and external gears and the type characters formed on the printing drum.
Figure 6:
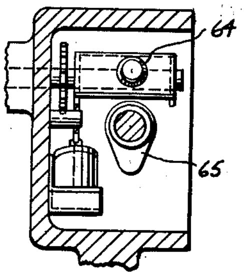
FIG. 6 is a sectional view taken substantially along the line 6—6 of FIG. 4.
Figure 8:
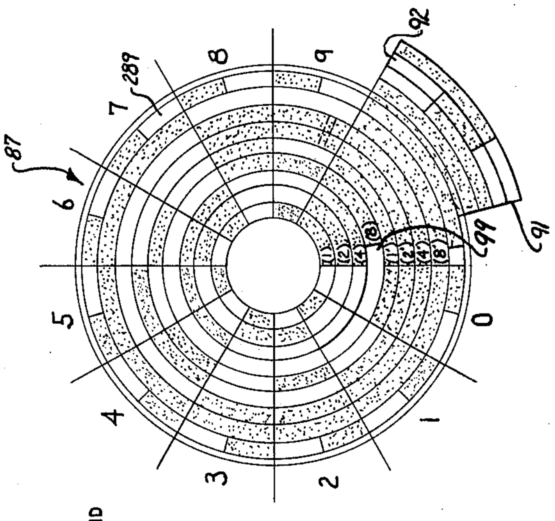
FIG. 8 is an enlarged front view of the commutator dics.

Shortly after contact 91 leaves brushes 93 and 94, a contact 99 engages the brush connected to the line 83*a*, thus applying a control pulse along line 1102 and through an amplifier 103 to the paper feed solenoid 73 (see also FIG. 4).

Since the output lines for the various counter decades are arranged in parallel, all duplicate digits in the different denominational orders are printed simultaneously and all other digits are printed when the corresponding combinational code represented by a group of contacts 87 passes under the brushes 285.

When the stop contact 92 passes under the brushes 93 and 95, a relatively high ground potential is applied along line 107 to the lower input of the "and" gate 97. Since the upper input of this gate is also high at this time, a control pulse is applied along line 108 to the flip-flops 98 and 104, thereby returning the same to their normal conditions wherein the right-hand side of the former and the left-hand side of the latter are high.

It should be noted that although the paper feed solenoid 73 is energized at the start of a digit printing operation, this will merely effect release of the bail 62 (FIG. 4). The actual paper advancement will be effected by the cam 65 (FIG. 6) during the period following the printing operation and when a space 99 on the disc 87 is passing under the brushes 285.

Due to the foregoing matching arrangement in which both the "true" as well as the "false" or prime digit indications are matched, it will be seen that no mis-matching can occur regardless of the type of coding used. For example, if the digit 3 were to be printed, the combinational code for such digit would be represented by energization of the binary digit lines (1) and (2) of the group 78 and the lines (4′) and (8′) of the group 77. Accordingly, in the absence of applicants' matching arrangement, and since the binary 1 would be scanned first, the printer would otherwise be actuated to print 1 instead of 3.

Figure 9:
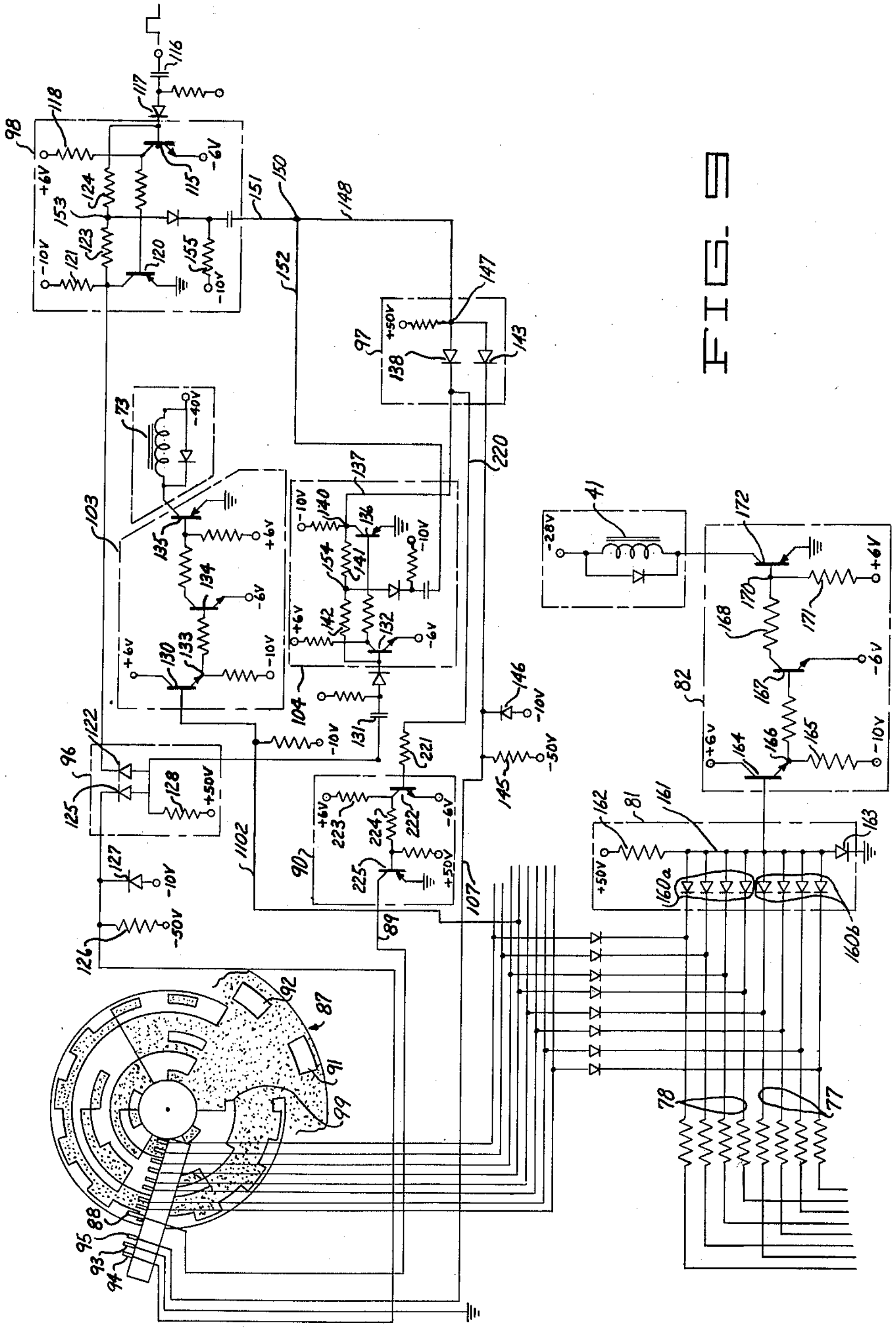
FIG. 9 is a detailed schematic view of the circuit shown in FIG. 7.

FIG. 9 illustrates in detail the circuitry disclosed in FIG. 7. Here, the flip-flop 98 comprises a normally non-conducting NPN transistor 115 having its emitter connected to a —6 volt source and its collector connected through a resistor 118 to a +6 volt source. Upon application of a positive print command pulse over a coupling capacitor 116 and diode 117 to the base of the transistor 115, the latter conducts to apply a negative pulse to the base of a normally non-conducting PNP transistor 120. The latter has its emitter connected to ground and its collector connected through a resistor 121 to a —10 volt source. Now, the transistor 120 becomes conductive to apply a relatively high ground potential to an input diode 122 of the "and" gate 96. Such rise in potential is also applied through resistors 123 and 124 to the base of transistor 115, thereby locking the flip-flop in its set condition.

A second input diode 125 of the "and" gate 96 is normally held at a relatively low potential by connection to a —50 volt source through a resistor 126, and is clamped at —10 volts through a diode 127 connected to a —10 volt source. However, when the start contact 91 bridges the brushes 93 and 94, the relatively higher ground potential is applied to the diode 125. The cathodes of diodes 122 and 125 are connected through a resistor 128 to a +50 volt source so that, as the anodes of both diodes rise in potential, an increase in voltage is applied through coupling condenser 131 to the flip-flop 104.

As a control pulse is applied through line 1102 to the base of transistor 130, the latter will conduct to raise the potential at point 133. A second normally non-conducting transistor 134 which is connected to the transistor 130 as an emitter follower is of the NPN type and as the positive pulse from point 133 is applied to the base thereof, it will conduct to transmit a negative pulse to the base of a normally non-conducting PNP transistor 135. The latter will now conduct to apply a relatively high ground potential to the paper space control solenoid 73 to energize the same.

The flip-flop 104 is similar in construction to that of flip-flop 98. Accordingly, the positive pulse applied thereto through condenser 131 will cause conduction of PNP transistor 132 to lower its collector potential so as to apply a negative pulse to the base of PNP transistor 136. The latter now conducts to apply ground potential over line 137 to the upper input diode 138 of "and" gate 97. Such rise in potential at point 140 will be applied over resistors 141 and 142 to the base of transistor 132 to maintain the flip-flop in its set condition.

The rise in potential at point 140 is also applied along line 220 and resistor 221 to the base of a normally non-conducting NPN transistor 222 having its emitter connected to a —6 volt source and its collector to a +6 volt source through a resistor 223. The transistor thus becomes conductive to transmit a drop in potential through resistor 224 to the base of a normally non-conducting PNP transistor 225.

The emitter of the latter is connected to ground and, as it becomes conductive, applies ground potential over line 89 to the brush 88.

A second input diode 143 of gate 97 is connected through line 107 and resistor 145 to a —50 volt supply, but is normally clamped at —10 volts by connection through a diode 146 to a —10 volt supply. However, when the stop contact 92 bridges the contacts 93 and 95, ground potential is applied to line 107. Thus, since current is now prevented from flowing through both diodes 138 and 143, point 147 in the output of the gate 97 will rise. Such rise in potential is applied over line 148, point 150 and lines 151 and 152 to common points 153 and 154 in the flip-flops 98 and 104, respectively. Such rise in potential will have no effect on either flip-flop, but when the stop contact 92 moves past the brushes 93 and 95, the corresponding drop in potential will be applied as a negative pulse through the resistor 124 of flip-flop 98 and 142 of flip-flop 104 to render the transistors 115 and 132 non-conducting, thereby returning the flip-flops to their original conditions.

The print solenoid control circuit for each denominational order of the machine comprises a series of diodes 160*a* and 160*b* located in the "and" gate 81, each diode having its cathode connected to a respective one of the groups of signal lines 77 and 78. The diodes 160*a* and 160*b* are connected through a common line 161 and resistor 162 to a +50 volt supply at one end and through a diode 163 to ground at its opposite end. Also, the line 161 is connected to the base of a normally non-conducting NPN transistor 164.

The transistor 164 has its collector connected to a +6 volt supply and its emitter to a —10 volt supply through a resistor 165. As the potential in line 161 rises, the transistor 164 will conduct and the consequent increase in potential at point 166 will be applied to the base of a second normally non-conducting NPN transistor 167. The latter has its emitter connected to —6 volt supply and its collector is connected through a resistor 168, point 170 and resistor 171 to a +6 volt supply. Thus, as the transistor 167 conducts, the potential at 170 will be lowered and this drop will be applied to the base of a normally non-conducting PNP transistor 172. Accordingly, the latter will conduct to apply ground potential to the print control solenoid 41 to energize the same.

It will be noted that the outer ring 289 of the disc 87 is broken into segments which are so arranged that a circuit will be completed to the contact sections 86 through brush 88 only after the various brushes 285 have fully engaged appropriate ones of such contact sections.

Figure 10:
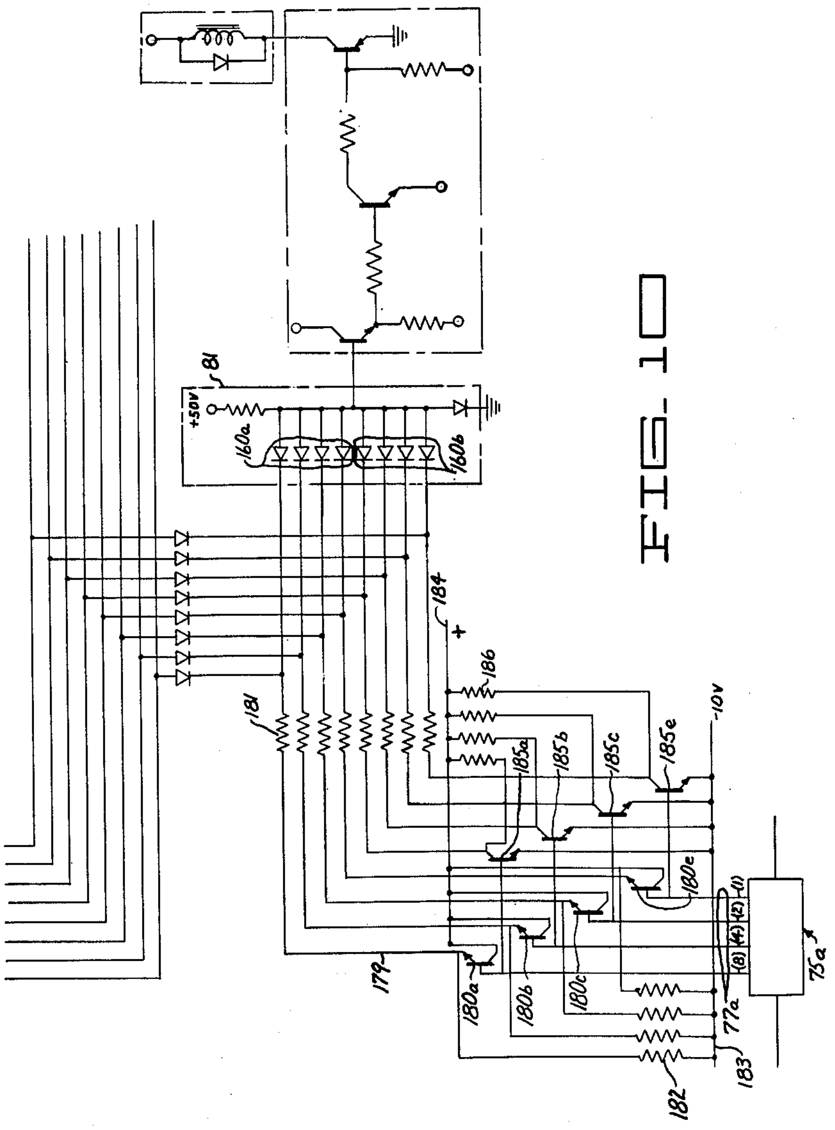
FIG. 10 is a schematic view illustrating a modified form of a portion of the circuit shown in FIGS. 7 and 9.

FIG. 10 illustrates a modified form of the invention and is intended for use in connection with coded decimal types of counter registers or the like wherein no "prime" or "false" outlets are available. Thus, only the "true" outlet lines 77*a* are shown connected to a respective counter decade. Here, the lines 77*a* are connected to the bases of respective normally non-conducting NPN transistors 180*a* to 180*e*. The emitter of each of the latter transistors is connected through a line 179 and resistor 181 to a respective one of the upper or "true" group of diodes 160*a* in the "and" gate 81. The emitters of these various transistors are also connected through respective resistors 182 to a −10 volt supply line 183.

When a digit line 77*a* is raised in potential to indicate a binary 1 registered by the corresponding stage of the counter, the respective transistor 180 is rendered conductive to apply a positive potential from a supply line 184 to the respective diode in the gate 81.

The different binary digit lines 77*a* are also connected to the bases of a second set of transistors 185*a* to 185*b*. The emitter of each of the latter is connected directly to the −10 volt supply line 183 and the collector thereof is connected through a resistor 186 to the plus supply line 184 and through one of the resistors 181 to a respective one of the lower groups of diodes 160*b* in the gate 81.

Accordingly, with no information registered by the counter, the diodes 160*a* normally pass current while the lower diodes 160*b* are normally blocked by virtue of the relatively high potential applied to them from line 184. However, when a digit line 77*a* is rendered high to indicate a binary digit, a relatively high potential is applied to the corresponding upper diode 160*a* and to the base of the respective one of transistors 185*a* to 185*e*. Such transistor is thus caused to conduct to apply a relatively low potential from line 183 to the associated lower diode 160*b*, thereby duplicating the effect which is obtained from the circuitry shown in FIG. 9.

It should be understood that the aforementioned apparatus may be used to translate and record information coded in various forms, it being necessary only to substitute a disc having an appropriate pattern of contact sections for the disc 87.

Although we have described our invention in detail and have therefore used certain specific terms and language herein, it is to be understood that the present disclosure is illustrative rather than restrictive and that changes and modifications may be made without departing from the spirit or scope of the invention as set forth in the appended claims.

Having thus described the invention, what we desire to secure by United States Letters Patent is:

1. A read-out system for an apparatus having a plurality of terminals which indicate different characters by combinations of distinctive potentials on different ones of said terminals and the complements of said characters by combinations of distinctive potentials on different others of said terminals, respectively, comprising the combination of a character recording device differentially movable into different positions for recording different respective ones of said characters, means for advancing said recording through said positions, a matrix of elements arranged in patterns appropriate to the possible combinations of distinctive potentials on said terminals, each of said patterns comprising two character groups, one of said groups of each of said patterns representing a different said character and the other of said groups representing the complement of said characters; a scanning device for said elements, means operable concomitantly with said advancing means for effecting relative scanning movement between said scanning device and said patterns of elements whereby to cause said scanning device to concurrently scan a said pattern representing a said character when said recording device moves into a recording position for said last mentioned character, and means responsive to said scanning device upon scanning a pattern of said elements appropriate to the said terminals having distinctive potentials thereon for effecting recording by said recording device.

2. A read-out system for an apparatus having a plurality of terminals which indicate different characters by combinations of distinctive potentials on different ones of said terminals and the complements of said characters by combinations of distinctive potentials on different others of said terminals, respectively, comprising the combination of a character recording device differentially movable into different positions for recording different respective ones of said characters, means for advancing said recording device through said positions, a matrix of elements arranged in patterns representing the possible combinations of said terminals not having said distinctive potentials thereon, each of said patterns comprising two character groups, one of said groups of each of said patterns representing a different said character and the other of said groups representing the complement of said character; a scanning device for said elements, means operable concomitantly with said advancing means for effecting relative scanning movement between said scanning device and said patterns of elements whereby to cause said scanning device to concurrently scan a said pattern representing a said character when said recording device moves into a recording position for said last mentioned character, and means responsive to said scanning device upon scanning a pattern of said elements corresponding to the said terminals not having said distinctive potentials thereon for effecting recording by said recording device.

3. A read-out system for translating and recording digits registered by an apparatus in accordance with a numeral system other than the decimal system, said apparatus having a plurality of terminals which indicate different digits by combinations of distinctive potentials on different ones of said terminals and the complements of said digits by combinations of distinctive potentials on different others of said terminals, respectively, comprising the combination of a recording device differentially movable into different positions for recording different respective decimal digits, means for advancing said recording device through said positions, a matrix of elements arranged in patterns appropriate to said other numeral system, each of said patterns comprising two digit groups, one of said groups of each of said patterns representing a digit and the other of said groups representing the complement of said digit; a scanning device for said patterns of elements, means operable concomitantly with said advancing means for effecting relative scanning movement between said scanning device and said patterns of elements whereby to cause said scanning device to scan a said pattern representing a said digit when said recording device moves into a recording position for said last mentioned digit, and means responsive to said scanning device upon scanning a pattern of said elements appropriate to the said terminals having distinctive potentials thereon for effecting recording by said recording device.

4. A read-out system for an apparatus having a plurality of terminals which indicate different characters by combinations of distinctive potentials on different ones of said terminals and the complements of said characters by combinations of distinctive potentials on different others of said terminals, respectively, comprising the combination of a recording device differentially movable into different positions for recording different respective ones of said characters, means for advancing said recording device through said positions, an actuating device for effecting recording by said recording device in any of said positions, an "and" gate, means for applying the output of said "and" gate to said actuating device, a plurality of input circuits for said "and" gate, means for connecting each of said input circuits to a respective one of said terminals, a matrix of contacts arranged in patterns relating to different possible combinations of distinctive potentials on said terminals, each of said patterns representing a character and its complement, a scanning device comprising a plurality of brushes for scanning said patterns of contacts; means operable in concert with said advancing means for effecting relative scanning movement between said scanning device and said patterns of contacts whereby to cause said brushes to scan a said pattern representing a said character when said recording device moves into a recording position for said last mentioned character, and an input circuit modifying device connected between different ones of said brushes and different ones of said input circuits, each of said circuit modifying devices being effective to apply a said distinctive potential to its respective input circuit when a contact in a respective pattern is scanned by a respective one of said brushes.

5. A read-out system for translating amounts registered by an apparatus in accordance with the numeral system other than the decimal system, said apparatus having a plurality of terminals which indicate different digits by combinations of distinctive potentials on different ones of said terminals and the complements of said digits by combinations of distinctive potentials on different others of said terminals, respectively, comprising the combination of a digit recording device differentially movable into different positions to record different respective ones of said digits, means for advancing said recording device through said different recording positions, an actuating device for effecting recording by said recording device in any of said positions, an "and" gate, means for applying the output of said "and" gate to said actuating device, a plurality of input circuits for said "and" gate, means for connecting each of said input circuits to a respective one of said terminals, a matrix of contacts arranged in patterns relating to the different digits in said other numeral system, each of said patterns representing digit and its complement, a scanning device comprising a plurality of brushes for scanning said patterns of contacts; means operable in concert with said advancing means for effecting relative scanning movement between said scanning device and said patterns of contacts whereby to cause said brushes to scan a said pattern representing a said digit when said recording device moves into a recording position for said last mentioned digit, and input circuit modifying devices connected between different ones of said brushes and different ones of said input circuits, each of said circuit modifying devices being effected to apply a said distinctive potential to its respective input circuit when a contact in a respective pattern is scanned by a respective one of said brushes.

6. A read-out system for translating amounts registered by an apparatus in accordance with a multi-unit code into a single unit code, said apparatus having a plurality of terminals which indicate different digits by combinations of distinctive potentials on different ones of said terminals and the complements of said digits by combinations of distinctive potentials on different others of said terminals, respectively, comprising the combination of a recording device differentially movable into different positions for recording different respective ones of said digits, means for advancing said recording device through said different recording positions, a device for actuating said recording device in any of said recording positions, an "and" gate, means for applying the output of said "and" gate to said actuating device, a plurality of input circuits for said "and" gate, means for connecting each of said input circuits to a respective one of said terminals, circuit modifying devices for respective ones of said input circuits, and means operable in concert with said advancing means for actuating said circuit modifying devices in accordance with said multi-unit code and its complements, each of said circuit modifying devices being effective when actuated to apply a said distinctive potential to its respective input circuit whereby to apply a distinctive potential to all of said input circuits when said recording device is in a recording position corresponding to the digit represented by the distinctive potentials on said terminals.

7. A read-out system for an apparatus having a plurality of terminals which indicate different digits by combinations of distinctive potentials on different ones of said terminals comprising the combination of a second plurality of terminals, means operatively connected to said first mentioned plurality of terminals for establishing distinctive potentials on said second plurality of said terminals which indicate the complements of said digits, a digit recording device differentially movable into different positions for recording different respective ones of said digits, means for advancing said recording device through said recording positions, a matrix of elements arranged in patterns representing the possible combinations of said terminals not having said distinctive potentials thereon, each of said patterns comprising two digit groups, one of said groups of each of said patterns representing a different said digit and the other of said groups representing the complement of said digit; a scanning device for said elements, means operable concomitantly with said advancing means for effecting relative scanning movement between said scanning device and said patterns of elements whereby to cause said scanning device to scan a said pattern representing a said digit when said recording device moves into a recording position for said last mentioned digit, and means responsive to said scanning device upon scanning a pattern of said elements corresponding to the said terminals not having said distinctive potentials thereon for effecting recording by said recording device.

8. A read-out system for an apparatus having a plurality of terminals which indicate different digits by combinations of distinctive potentials on different ones of said terminals comprising the combination of a second plurality of terminals, potential inverting devices connected between said first mentioned plurality of terminals and respective ones of said second plurality of terminals for establishing on said second plurality of terminals distinctive potentials which indicate the complements of said digits, a recording device differentially movable into different positions for recording different respective ones of said digits, means for advancing said recording device through said positions, a matrix of elements arranged in patterns complementing the possible combinations of distinctive potentials on said terminals, each of said patterns comprising two digit groups, one of said groups of each of said patterns representing a different said digit and the other of said groups representing the complement of said digit; a scanning device for said elements, means operable concomitantly with said advancing means for effecting relative scanning movement between said scanning device and said patterns of elements whereby to cause said scanning device to scan a said pattern representing a said digit when said scanning device moves into a recording position for said last mentioned digit, and means responsive to said scanning device upon scanning a pattern of said elements which complement the said terminals having distinctive potentials thereon for effecting recording by said recording device.

9. A read-out system for an apparatus having a plurality of terminals which indicate different digits by combinations of distinctive potentials on different ones of said terminals comprising the combination of a digit recording device differentially movable into different digit recording positions, means for continuously advancing said recording device through said recording positions, a matrix of contacts arranged in patterns in accordance with the possible combinations of said terminals not having distinctive potentials thereon, a normally ineffective scanning device for said contacts, means operable in concert with said advancing means for effecting relative scanning movement between said scanning device and said patterns of contacts, means responsive to said scanning device when rendered effective and upon scanning a pattern of one or more of said contacts corresponding to the one or more of said terminals not having distinctive potentials thereon for effecting recording by said recording device, an "and" gate having two inputs, a start contact connected to one of said inputs and adapted to be scanned by said scanning device whereby to energize said one of said inputs, a bi-stable circuit adapted when in one condition to energize the other input of said "and" gate, means connecting the output of said "and" gate to said scanning device whereby to render said scanning device effective upon energization of said output, means for setting said bi-stable circuit in said one condition, and a stop contact connected to said bi-stable circuit and adapted when energized to set said bi-stable circuit in a second condition thereof, said scanning device being effective to energize said stop contact after scanning said patterns of contacts.

References Cited in the file of this patent

UNITED STATES PATENTS

| | | |
|---|---|---|
| 2,620,980 | Brown | Dec. 9, 1952 |
| 2,754,502 | Dickinson | July 10, 1956 |
| 2,895,124 | Harris | July 14, 1959 |
| 2,909,768 | Kautz | Oct. 20, 1959 |